US012578068B2

(12) United States Patent
Xu et al.

(10) Patent No.: US 12,578,068 B2
(45) Date of Patent: Mar. 17, 2026

(54) LIGHTING DEVICE WITH A LIGHT EMITTING DIODE LAYOUT AND POSITION THAT PROVIDES AN IMPROVED BEAM PERFORMANCE

(71) Applicant: LUMILEDS LLC, San Jose, CA (US)

(72) Inventors: Yong-Long Xu, Shanghai (CN); Matthias Grove, Shanghai (CN); Lukas Kuepper, Aachen (DE); Jing Wang, Shanghai (CN)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 18/394,222

(22) Filed: Dec. 22, 2023

(65) Prior Publication Data

US 2025/0172265 A1 May 29, 2025

(30) Foreign Application Priority Data

Nov. 27, 2023 (WO) ................ PCT/CN2023/134197

(51) Int. Cl.
*F21S 41/148* (2018.01)
*F21W 102/14* (2018.01)
*F21Y 115/10* (2016.01)

(52) U.S. Cl.
CPC ........ *F21S 41/148* (2018.01); *F21W 2102/14* (2018.01); *F21Y 2115/10* (2016.08)

(58) Field of Classification Search
CPC ............. F21Y 2103/10; F21Y 2105/10; F21Y 2113/13; F21Y 2107/50; F21Y 2107/90; F21Y 2105/12; F21Y 2105/16; F21S 41/151; F21S 41/153; F21S 43/15; F21K 9/235; F21K 9/237; F21K 9/238; F21V 23/005; B60Q 1/04; F21W 2102/13; F21W 2102/00; F21W 2107/10; H01L 25/0753
See application file for complete search history.

(56) References Cited

U.S. PATENT DOCUMENTS

| | | | | |
|---|---|---|---|---|
| 2004/0223338 | A1 * | 11/2004 | Koike | F21S 43/14 362/545 |
| 2018/0023795 | A1 | 1/2018 | Elwell et al. | |
| 2018/0066821 | A1 | 3/2018 | Huang et al. | |
| 2018/0356061 | A1 | 12/2018 | Wang et al. | |

(Continued)

FOREIGN PATENT DOCUMENTS

| | | | | |
|---|---|---|---|---|
| DE | 102010063713 A1 * | 6/2012 | | F21S 41/141 |
| JP | 2022-144102 A | 10/2022 | | |

(Continued)

OTHER PUBLICATIONS

Search English translation of WO-2022185136-A1 (Year: 2022).*

(Continued)

*Primary Examiner* — Omar Rojas Cadima
(74) *Attorney, Agent, or Firm* — Day Pitney LLP; Richard B. Emmons; Jacob J. Golan

(57) ABSTRACT

A headlighting system is provided. The headlighting system includes a plate. The headlighting system includes a reference plane. The headlighting system includes light emitting diode filaments. The light emitting diode filaments are on the plate. The light emitting diode filaments are on the plate at reference positions. The reference positions are set at distances from the reference plane.

16 Claims, 6 Drawing Sheets

(56) References Cited

U.S. PATENT DOCUMENTS

2022/0357008 A1* 11/2022 Kuepper ................. F21K 9/232
2023/0160543 A1 5/2023 Schramm et al.

FOREIGN PATENT DOCUMENTS

TW M498688 U * 4/2015
WO WO-2022185136 A1 * 9/2022 ............... F21K 9/23

OTHER PUBLICATIONS

Search English translation of DE-102010063713-A1 (Year: 2012).*
Search English translation of TW M498688 U (Year: 2015).*
International Search Report and Written Opinion mailed May 7, 2024 for PCT International Application No. PCT/CN2023/134197.

* cited by examiner

200

| Name | Value (cd) | OK | min (cd) | max (cd) | test pos (deg) | found pos (deg) |
|---|---|---|---|---|---|---|
| 1.0U 1.5L-L | 1817.9 | ?? | - - | 700.0 | -20.00, 1.00; -1.50, 1.00 | -1.50, 1.00 |
| 1.0U 1.5L-L | 3545.4 | ?? | - - | 1000.0 | -20.00, 0.50; -1.50, 0.50 | -1.50, 0.50 |
| 0.5U 1L-3R | 3362.5 | ?? | 500.0 | 2700.0 | -1.00, 0.50; 3.00, 0.50 | 1.25, 0.50 |

FIG. 2

400

| Name | Value (cd) | OK | min (cd) | max (cd) | test pos (deg) | found pos (deg) |
|---|---|---|---|---|---|---|
| 1.0U 1.5L-L | 944.3 | ?? | - - | 700.0 | -20.00, 1.00; -1.50, 1.00 | -1.50, 1.00 |
| 1.0U 1.5L-L | 2130.0 | ?? | - - | 1000.0 | -20.00, 0.50; -1.50, 0.50 | -1.50, 0.50 |
| 0.5U 1L-3R | 3292.3 | ?? | 500.0 | 2700.0 | 1.00, 0.50; 3.00, 0.50 | 2.50, 0.50 |

FIG. 4

LIGHTING DEVICE WITH A LIGHT EMITTING DIODE LAYOUT AND POSITION THAT PROVIDES AN IMPROVED BEAM PERFORMANCE

CROSS-REFERENCE TO RELATED APPLICATIONS

This application claims priority to International Application Number PCT/CN2023/134197, filed on Nov. 27, 2023, the contents of which are hereby incorporated by reference in their entirety.

BACKGROUND

Conventional lighting technologies for automobiles provide light within performance and range requirements. However, as these performance and range requirements change and/or increase, conventional lighting technologies require improvement.

For example, conventional lighting technologies for automobiles include two (2) vertical "filaments" on both sides of a panel. These two (2) vertical filaments have a glare value of 1818 cd candela (cd) and a big halogen benchmark gap. Candela (cd) is a luminous intensity unit in a specific direction defined by the International System of Units (SI). The conventional lighting technology of a halogen HB5 device has glare and figure of merit (FOM) of 580 cd and 69,417 cd, respectively. Another example of conventional lighting technologies can include a halogen HB1 device with a glare of 1,102.2 cd and a FOM of 81,706 cd. Glare defines a seeing difficulty in a bright light presence, such as artificial light from conventional lighting technologies for automobiles, in candela. FOM defines how much light is in front of a car in candela (e.g., good visibility distance). The conventional lighting technology of a halogen HB1 device also has a power of 65 W/45 W for low beam/high beam (LB/HB). Further, conventional lighting technologies for automobiles can include an e value of 42.8 millimeters (mm)/41.1 mm for LB/HB. The e value can be a distance of filaments from a plane.

Yet, conventional lighting technologies for automobiles offer no solution for better illumination as performance and range requirements change and/or increase.

SUMMARY

According to one or more embodiments, a headlighting system is provided. The headlighting system includes a plate, a reference plane, and at least two light emitting diode filaments configured on the plate at one or more reference positions set at one or more distances from the reference plane.

According to one or more embodiments, a vehicle headlighting system is provided. The headlighting system includes a plate, a protruding member comprising a surface providing a reference plane, a first light emitting diode filament on a first side of the plate for low beam generation and configured at a reference position that is separated from the reference plane by a distance along a central axis of the vehicle headlighting system, and a second light emitting diode filament on a second side of the plate for high beam generation and configured at the reference position at the distance.

BRIEF DESCRIPTION OF THE DRAWINGS

A more detailed understanding can be had from the following description, given by way of example in conjunction with the accompanying drawings wherein:

FIG. 2 provides a performance table according to one or more embodiments;

FIG. 4 provides a performance table according to one or more embodiments;

DETAILED DESCRIPTION

Figure 1:
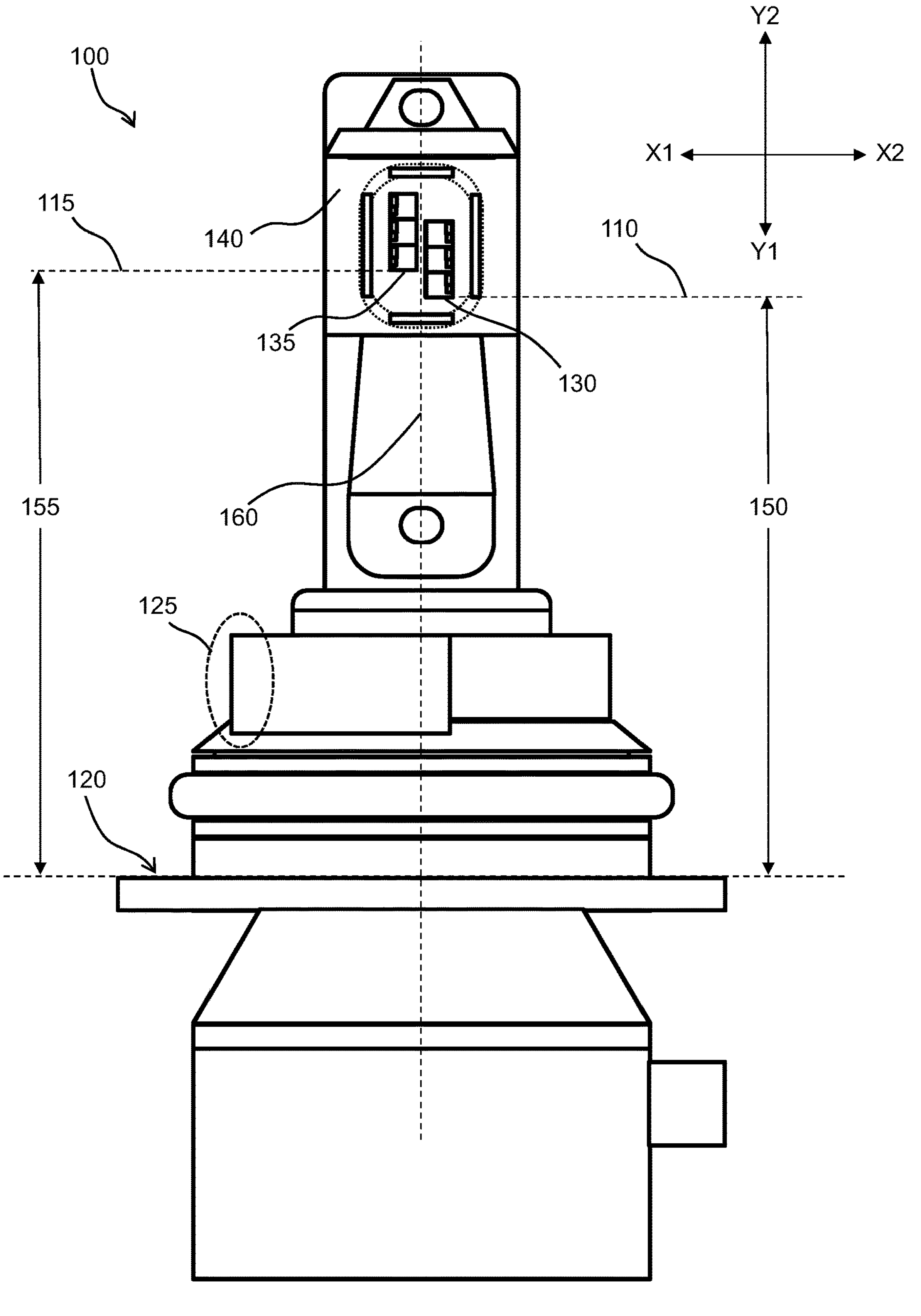
FIG. 1 depicts a device according to one or more embodiments.

According to one or more embodiments, described herein is a headlighting system. Generally, the headlighting system generates a safe road beam with low glare and good visibility distance (FOM). Safe is an adjective for a road beam that would not blind or otherwise distract other drivers because the glare of the road beam is at a level that does not affect another's vision while the road beam also provides enough illumination (e.g., good visibility distance) to enable proper driving by the driver. The headlighting system includes a LED layout and position to provide an improvement on beam performance (e.g., lower glare and higher FOM) over the conventional lighting technologies. For example, the headlighting system includes an improved light engine that generates a lighting range (e.g., lower glare and higher FOM) at a reduced manufacturing cost. Further, the headlighting system is electrically compatible with vehicles (e.g., existing automobiles), for example being polarity free.

According to one or more embodiments, the headlighting system includes two horizontal filaments on one side (i.e., one for LB or passing beam, and another for HB or driving beam). The headlighting system provides e value from 42.8 mm/41.1 mm for LB and HB, respectively.

According to one or more embodiments, the headlighting system includes one filament on each side (i.e., one for LB or passing beam, and another for HB or driving beam). The headlighting system provides the filament in a horizontal (e.g., provides "filaments" and "reference positions for installation" as turned 90 degrees). The headlighting system provides a same e value of 43.75 mm for both LB and HB.

The one or more technical effects, advantages, and benefits of the headlighting system include providing a glare along a range of 500 cd to 2,700 cd (e.g., 944.3 cd, 945 cd, 1150 cd, and/or 1,236 cd) and FOM along a range of 90,000 cd to 300,000 cd (e.g., 100,000 cd, 112,392 cd, 130,232 cd, and/or 161,375 cd), which is an improvement over a conventional lighting technology of a halogen HB1 device, i.e., with a glare of 1,102.2 cd and a FOM of 81,706 cd. According to one or more embodiments, the glare range can be from 700 cd to 1000 cd, and the FOM range can be from 110,000 cd to 162,000 cd. The one or more technical effects, advantages, and benefits of the headlighting system include providing a reduced power from 20 W to 14 W for both LB and HB, which is much lower than a power of a conventional lighting technology, e.g., of a halogen HB1 at 65 W/45 W for LB/HB.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements throughout.

FIG. 1 shows a device 100 according to one or more embodiments. The device 100 is an example of the head-lighting system to provide an improvement on beam performance (e.g., provide a lower glare and a higher FOM) over the conventional lighting technologies.

The device 100 of FIG. 1 is oriented according to an X1-X2 axis and a Y1-Y2 axis. The X1-X2 axis is generally horizontal as oriented in the Figures, with the X1-X2 axis having a direction between left (X1) and right (X2). The Y1-Y2 axis is generally vertically as oriented in the Figures, with the axis having a direction between down (Y1) and up (Y2). The X1 direction is opposite the X2 direction, and the Y1 direction is opposite the Y2 direction. Other orientations can be made in accordance with the X1-X2 and Y1-Y2 axes, which may be tilted or angled. Reference to a left side or left facing surface of a component described may be referred to as an X1 side or an X1 surface of the component, while reference to a right side or right facing surface of a component described may be referred to as an X2 side or an X2 surface of the component. Similarly, reference to a lower or bottom side or a downwardly facing surface of a component described may be referred to as a Y1 side or a Y1 surface, while reference to a top or upper side or upwardly facing surface of a component described may be referred to as a Y2 side or a Y2 surface.

The device 100 includes a reference positions 110 and 115 for installation, a reference plane 120, at least two LED filaments 130 and 135, and a plate 140. The reference positions 110 and 115 for installation can be positions that are compatible with a vehicle (e.g., with existing automobiles to replace the halogen HB1 device).

According to one or more embodiments, one of the at least two LED filaments 130 and 135 provides LB generation, and another one of the at least two LED filaments 130 and 135 provides HB generation. For example, the at least two LED filaments 130 and 135 can include a first LED filament 130 and a second LED filament 135. Further, the first LED filament 130 can be for LB generation, and the second LED filament 135 can be for HB generation. The plate 140 can include two sides.

According to one or more embodiments, the at least two LED filaments 130 and 135 are installed together on a first side. For instance, a second or opposite side of the plate 140 can include no LED filaments. Alternatively, the second or opposite side of the plate 140 can also include one or more LED filaments.

The at least two LED filaments 130 and 135 are installed/configured on the plate 140 to ensure that the device 100 is compatible with the vehicle (e.g., existing automobiles). According to one or more embodiments, the at least two LED filaments 130 and 135 are installed/configured on the plate 140 at separate distances 150 and 155 from a portion of the device 100 (e.g., at the reference positions 110 and 115). The portion of the device 100 can be any member, flange, edge, surface plate, or panel of the device 100. By way of example, the portion of the device 100 can be a protruding member used for alignment when the device 100 is installed in the vehicle.

According to one or more embodiments, the portion of the device 100 can be a Y2 surface of a protruding member that is contemporaneous with the reference plane 120. The at least two LED filaments 130 and 135 can be oriented in a vertical or a Y1-Y2 direction on the plate 140 so that a Y1 edge of one LED filament 130 aligns with the reference position 110 and a Y1 edge of another LED filament 135 aligns with the reference position 115. Thus, the distances 150 and 155 traverse on along the Y1-Y2 direction (e.g., along a central axis 160 of the device 100) from the Y1 edge of one of the at least two LED filaments 130 and 135 to the reference plane 120 (e.g., an e value). The distances 150 and 155 are selected from a range to ensure that the devices 100 has proper dimensions to be compatible with the vehicle (e.g., existing automobiles) by the at least two LED filaments 130 and 135 being in proper positions for the vehicle. Additionally, as the device 100 includes the central axis 160, the at least two LED filaments 130 can be oriented with respect to the central axis 160.

According to one or more embodiments, the range for the distances 150 and 155 can be selected from 35 mm to 50 mm. Further, the range for the distance 150 and 155 can be selected from can be from 40.1 mm to 43.0 mm. According to one or more embodiments, the device 100 provides the LED filament 130 at a first e value of 42.8 mm and the LED filament 135 at a second e value of 41.1 mm. Thus, the distance 150 from the Y1 edge of the LED filament 130 to the reference position 120 can be determined as 42.8 mm, and the distance 155 from the Y1 edge of the LED filament 135 to the reference position 120 can be determined as 41.1 mm (e.g., first distance is greater than the second distance).

FIG. 2 shows a performance table 200 according to one or more embodiments. The performance table 200 shows beam performance test results of a beam generated by the device 100. From left to right, a first column of table 200 provides a name of LED configurations, a second column of table 200 provides a glare (e.g., a glare of 1817.9 cd or 1818 cd is shown in row two (2)), a third column of table 200 provides a Boolean tagging, a fourth column of table 200 provides a minimum glare, a fifth column of table 200 provides a maximum, a sixth column of table 200 provides a test position on the plate 140, and a seventh column of table 200 provides a found position on the plate 140. The one or more technical effects, advantages, and benefits of the device 100 include providing a glare along a range of 500 cd to 2,700 cd (e.g., 1817.9 cd or 1818 cd) and FOM along a range of 110,000 cd to 162,000 cd (e.g., 161,375 cd), which is an improvement over a conventional lighting technology of a halogen HB1 device, i.e., with a glare of 580 cd and a FOM of 69,417 cd.

Figure 3:
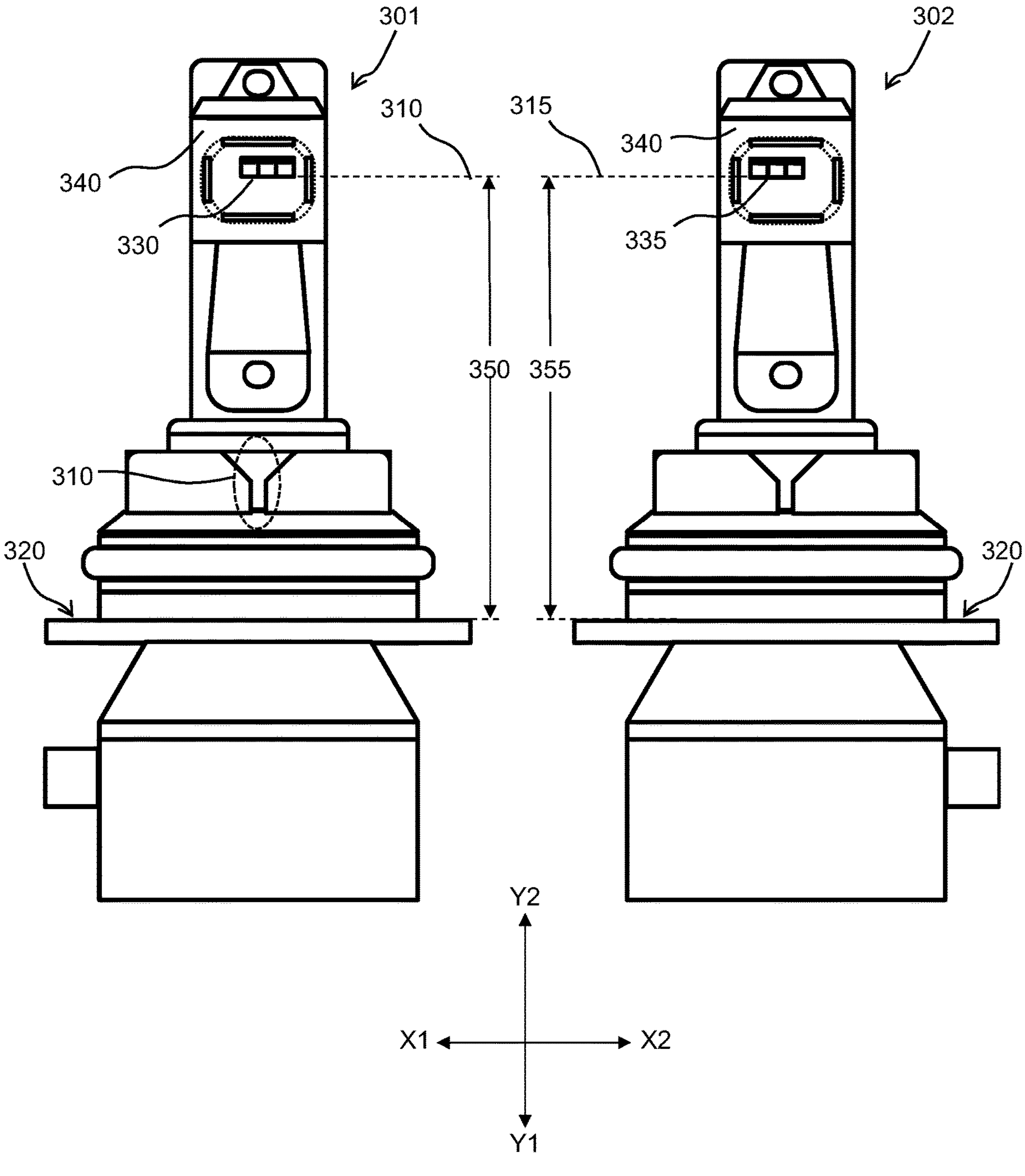
FIG. 3 depicts a device according to one or more embodiments.

FIG. 3 shows a device 300 according to one or more embodiments. The device 300 is an example of the head-lighting system to provide an improvement on beam performance (e.g., provide a lower glare and a higher FOM) over the conventional lighting technologies.

The device 300 of FIG. 3 is oriented according to an X1-X2 axis and a Y1-Y2 axis. The X1-X2 axis is generally horizontal as oriented in the Figures, with the X1-X2 axis having a direction between left (X1) and right (X2). The Y1-Y2 axis is generally vertically as oriented in the Figures, with the axis having a direction between down (Y1) and up (Y2). The X1 direction is opposite the X2 direction, and the Y1 direction is opposite the Y2 direction. Other orientations can be made in accordance with the X1-X2 and Y1-Y2 axes, which may be tilted or angled. Reference to a left side or left facing surface of a component described may be referred to as an X1 side or an X1 surface of the component, while reference to a right side or right facing surface of a component described may be referred to as an X2 side or an X2 surface of the component. Similarly, reference to a lower or bottom side or a downwardly facing surface of a component described may be referred to as a Y1 side or a Y1 surface, while reference to a top or upper side or upwardly facing surface of a component described may be referred to as a Y2 side or a Y2 surface.

The device 300 includes a reference positions 310 and 315 for installation, a reference plane 320, at least two LED filaments 330 and 335, and a plate 340. The reference positions 310 and 315 for installation can be positions that are compatible with a vehicle (e.g., with existing automobiles to replace the halogen HB1 device).

According to one or more embodiments, one of the at least two LED filaments 330 and 335 provides LB generation, and another one of the at least two LED filaments 330 and 335 provides HB generation. For example, the at least two LED filaments 330 and 335 can include a first LED filament 330 and a second LED filament 335. Further, the first LED filament 330 can be for LB generation, and the second LED filament 335 can be for HB generation. The plate 340 can include two sides.

According to one or more embodiments, the at least two LED filaments 330 and 335 are installed on opposite side. For instance, a first side of the plate 340 can include the first LED filament 330, and the second side of the plate 340 can include the second LED filament 335.

The at least two LED filaments 330 and 335 are installed/configured on the plate 140 to ensure that the device 100 is compatible with the vehicle (e.g., existing automobiles). According to one or more embodiments, the at least two LED filaments 330 and 335 are installed/configured on the plate 140 at distances 350 and 355 from a portion of the device 300 (e.g., at the reference positions 310 and 315). The portion of the device 300 can be any member, flange, edge, surface plate, or panel of the device 300. By way of example, the portion of the device 300 can be a protruding member used for alignment when the device 300 is installed in the vehicle.

According to one or more embodiments, the portion of the device 300 can be a Y2 surface of a protruding member that is contemporaneous with the reference plane 320. The at least two LED filaments 330 and 335 can be oriented in a vertical or a Y1-Y2 direction on the plate 140 so that a Y1 edge of one LED filament 330 aligns with the reference position 3 and a Y1 edge of another LED filament 335 aligns with the reference position 315. Thus, the distances 350 and 355 traverse on along the Y1-Y2 direction (e.g., along a central axis 360 of the device 300) from the Y1 edges of the at least two LED filaments 330 and 335 to the reference plane 320 (e.g., an e value). The distances 350 and 355 are selected from a range to ensure that the devices 300 has proper dimensions to be compatible with the vehicle (e.g., existing automobiles) by the at least two LED filaments 330 and 335 being in proper positions for the vehicle. Additionally, as the device 300 includes the central axis 360, the at least two LED filaments 330 can be oriented with respect to the central axis 160. The at least two LED filaments 330 can be is horizontal on the plate 340 (e.g., in a horizontal position that is normal to the central axis 360).

According to one or more embodiments, the range for the distances 350 and 355 can be selected from 35 mm to 50 mm. Further, the range for the distances 350 and 355 can be selected from can be from 40.1 mm to 43.0 mm. According to one or more embodiments, the device 300 provides the both LED filaments 335 at a first e value of 43.75. Thus, the distance 350 from the Y1 edge of the LED filament 330 to the reference position 320 and the distance 355 from the Y1 edge of the LED filament 335 to the reference position 320 can be determined as 43.75 mm (e.g., the distances 350 and 355 are the same).

FIG. 4 shows a performance table 200 according to one or more embodiments. The performance table 200 shows beam performance test results of a beam generated by the device 100. From left to right, a first column of table 200 provides a name of LED configurations, a second column of table 200 provides a glare (e.g., a glare of 944.3 cd or 945 cd is shown in row two (2)), a third column of table 200 provides a Boolean tagging, a fourth column of table 200 provides a minimum glare, a fifth column of table 200 provides a maximum, a sixth column of table 200 provides a test position on the plate 140, and a seventh column of table 200 provides a found position on the plate 140. The one or more technical effects, advantages, and benefits of the device 100 include providing a glare along a range of 500 cd to 2,700 cd (e.g., 944.3 cd or 945 cd) and FOM along a range of 110,000 cd to 162,000 cd (e.g., 112,392 cd), which is an improvement over a conventional lighting technology of a halogen HB1 device, i.e., with a glare of 580 cd and a FOM of 69,417 cd.

Figure 5:
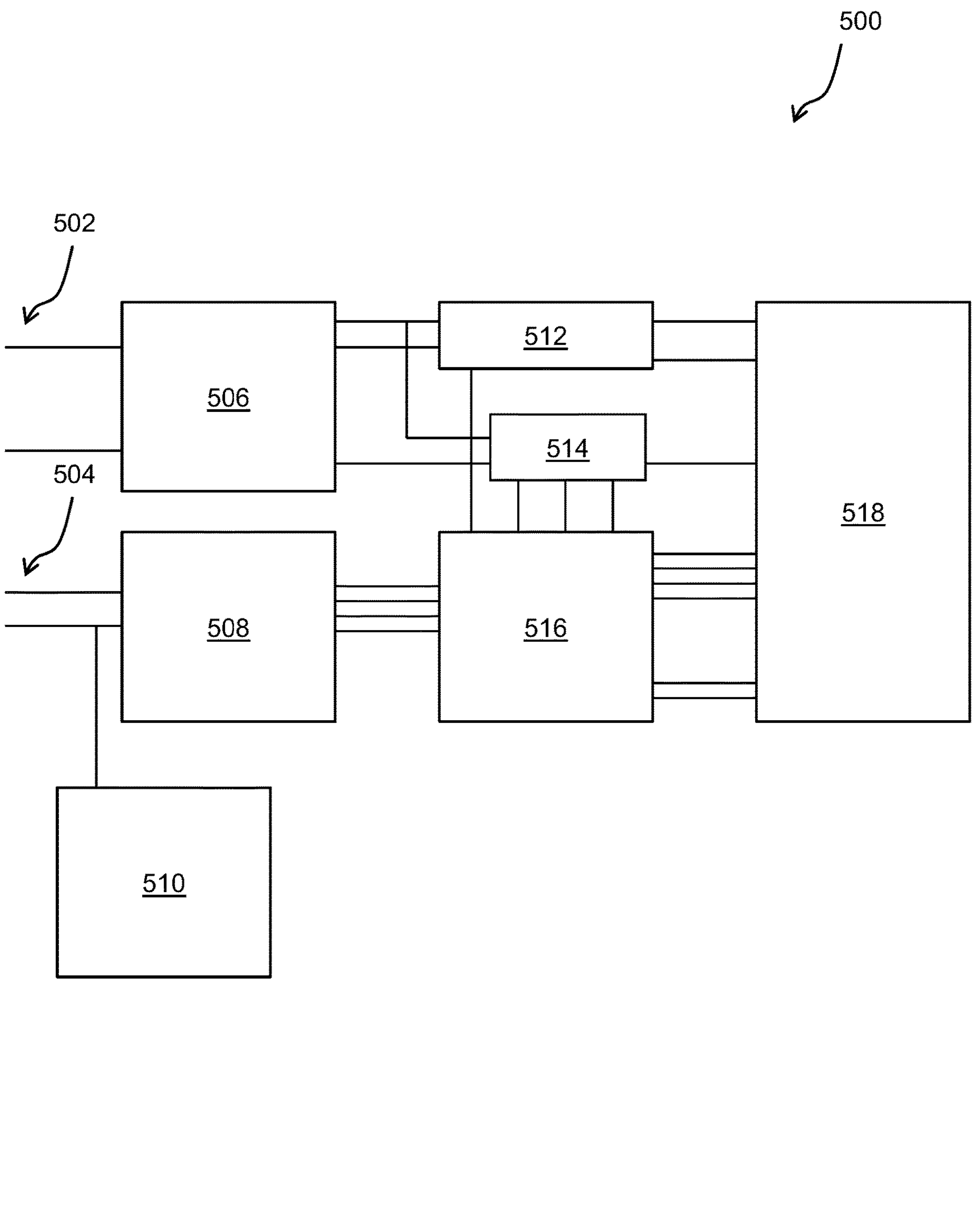
FIG. 5 is a diagram of an example vehicle headlamp system.

FIG. 5 is a diagram of an example vehicle headlamp system 500 that may incorporate one or more of the embodiments and examples described herein. The example vehicle headlamp system 500 illustrated in FIG. 5 includes power lines 502, a data bus 504, an input filter and protection module 506, a bus transceiver 508, a sensor module 510, an LED direct current to direct current (DC/DC) module 512, a logic low-dropout (LDO) module 514, a micro-controller 516, and an active head lamp 518.

The power lines 502 may have inputs that receive power from a vehicle, and the data bus 504 may have inputs/outputs over which data may be exchanged between the vehicle and the vehicle headlamp system 500. For example, the vehicle headlamp system 300 may receive instructions from other locations in the vehicle (e.g., instructions to turn on turn signaling or turn on headlamps) and may send feedback to other locations in the vehicle if desired. The sensor module 510 may be communicatively coupled to the data bus 504 and may provide additional data to the vehicle headlamp system 500 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 500. In FIG. 5, the headlamp controller may be a micro-controller, for example micro-controller (pc) 516. The micro-controller 516 may be communicatively coupled to the data bus 504.

The input filter and protection module 506 may be electrically coupled to the power lines 502 and may, for example, support various filters to reduce conducted emissions and provide power immunity. Additionally, the input filter and protection module 506 may provide electrostatic discharge (ESD) protection, load-dump protection, alternator field decay protection, and/or reverse polarity protection.

The LED DC/DC module 512 may be coupled between the input filter and protection module 106 and the active headlamp 518 to receive filtered power and provide a drive current to power LEDs in the LED array in the active headlamp 518. The LED DC/DC module 512 may have an input voltage between 5 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 514 may be coupled to the input filter and protection module 506 to receive the filtered power. The logic LDO module 514 may also be coupled to the micro-controller 516 and the active headlamp 518 to provide power to the micro-controller 516 and/or electronics in the active headlamp 518, for example CMOS logic.

The bus transceiver 508 may have, for example, a universal asynchronous receiver transmitter (UART) or serial peripheral interface (SPI) interface and may be coupled to the micro-controller 516. The micro-controller 516 may translate vehicle input based on, or including, data from the sensor module 510. The translated vehicle input may include a video signal that is transferrable to an image buffer in the active headlamp 518. In addition, the micro-controller 516 may load default image frames and test for open/short pixels during startup. In embodiments, an SPI interface may load an image buffer in CMOS. Image frames may be full frame, differential or partial frames. Other features of micro-controller 516 may include control interface monitoring of CMOS status, including die temperature, as well as logic LDO output. In embodiments, LED DC/DC output may be dynamically controlled to minimize headroom. In addition to providing image frame data, other headlamp functions, for example complementary use in conjunction with side marker or turn signal lights, and/or activation of daytime running lights, may also be controlled.

Figure 6:
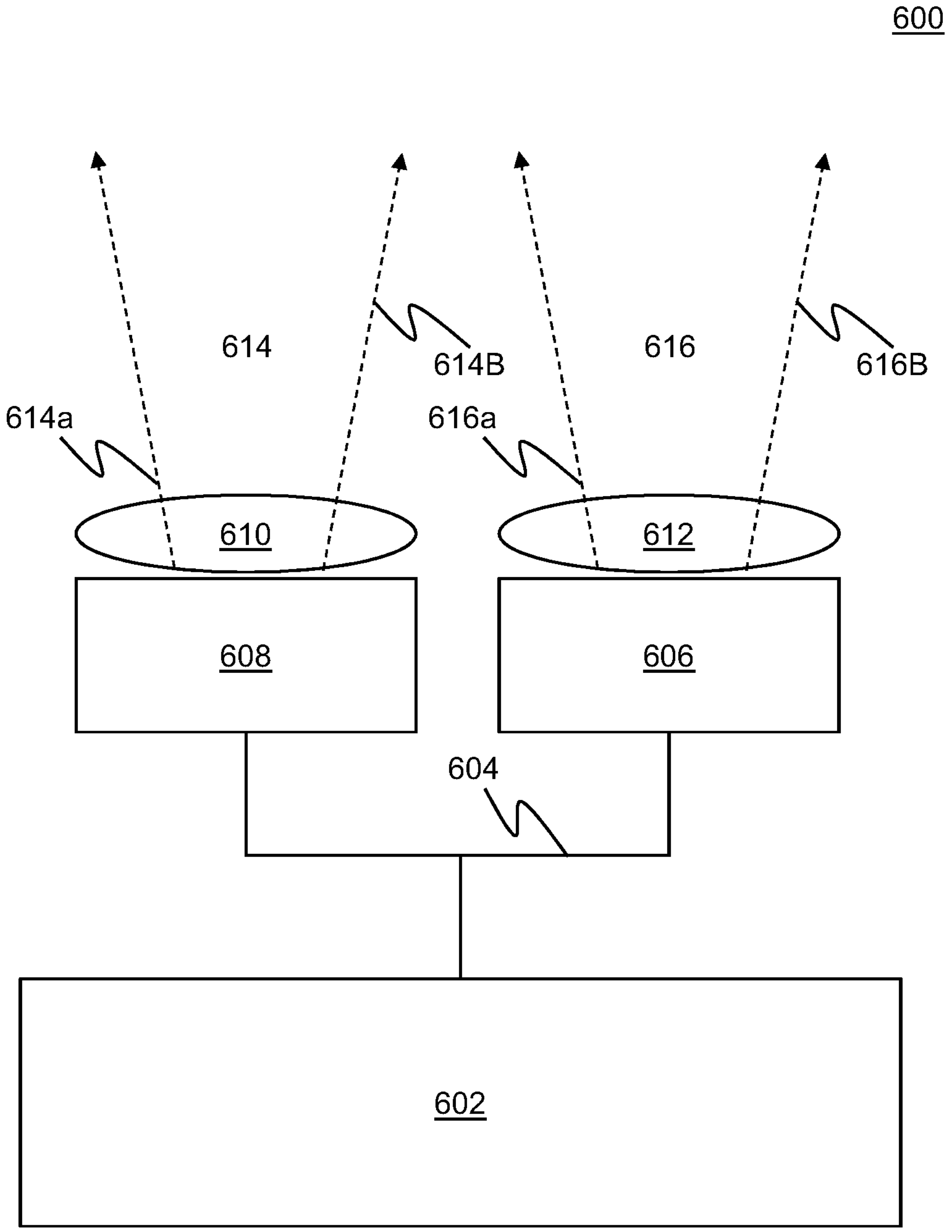
FIG. 6 is a diagram of another example vehicle headlamp system.

FIG. 6 is a diagram of another example vehicle headlamp system 600. The example vehicle headlamp system 600 illustrated in FIG. 6 includes an application platform 602, two LED lighting systems 606 and 608, and secondary optics 610 and 612.

The LED lighting system 608 may emit light beams 614 (shown between arrows 614*a* and 614*b* in FIG. 6). The LED lighting system 606 may emit light beams 616 (shown between arrows 616*a* and 616*b* in FIG. 6). In the embodiment shown in FIG. 6, a secondary optic 610 is adjacent the LED lighting system 608, and the light emitted from the LED lighting system 608 passes through the secondary optic 610. Similarly, a secondary optic 612 is adjacent the LED lighting system 606, and the light emitted from the LED lighting system 606 passes through the secondary optic 612. In alternative embodiments, no secondary optics 610/812 are provided in the vehicle headlamp system.

Where included, the secondary optics 610/812 may be or include one or more light guides. The one or more light guides may be edge lit or may have an interior opening that defines an interior edge of the light guide. LED lighting systems 608 and 606 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 608 and 606 in a desired manner, for example, for example, with a gradient, a chamfered distribution, a narrow distribution, a wide distribution, or an angular distribution.

The application platform 602 may provide power and/or data to the LED lighting systems 606 and/or 608 via lines 604, which may include one or more or a portion of the power lines 502 and the data bus 504 of FIG. 5. One or more sensors (which may be the sensors in the vehicle headlamp system 600 or other additional sensors) may be internal or external to the housing of the application platform 602. Alternatively, or in addition, as shown in the example vehicle headlamp system 500 of FIG. 5, each LED lighting system 608 and 606 may include its own sensor module, connectivity and control module, power module, and/or LED array.

In embodiments, the vehicle headlamp system 600 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 606 and 608 may be sensors (e.g., similar to sensors in the sensor module 510 of FIG. 5) that identify portions of a scene (e.g., roadway or pedestrian crossing) that require illumination.

As would be apparent to one skilled in the relevant art, based on the description herein, embodiments of the present invention can be designed in software using a hardware description language (HDL) for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

Having described the embodiments in detail, those skilled in the art will appreciate that, given the present description, modifications may be made to the embodiments described herein without departing from the spirit of the inv concept. Therefore, it is not intended that the scope of the invention be limited to the specific embodiments illustrated and described.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

It will be understood that when an element, for example a layer, region, or substrate, is referred to as being "on" or extending "onto" another element, it may be directly on or extend directly onto the other element or intervening elements may also be present. In contrast, when an element is referred to as being "directly on" or extending "directly onto" another element, there may be no intervening elements present. It will also be understood that when an element is referred to as being "connected" or "coupled" to another element, it may be directly connected or coupled to the other element and/or connected or coupled to the other element via one or more intervening elements. In contrast, when an element is referred to as being "directly connected" or "directly coupled" to another element, there are no intervening elements present between the element and the other element. It will be understood that these terms are intended to encompass different orientations of the element in addition to any orientation depicted in the figures.

Relative terms, for example "below," "above," "upper,", "lower," "horizontal" or "vertical", may be used herein to describe a relationship of one element, layer, or region to another element, layer, or region as illustrated in the figures. It will be understood that these terms are intended to encompass different orientations of the device in addition to the orientation depicted in the figures.

What is claimed is:

1. A headlighting system comprising:

a plate having a top surface, a bottom surface, and a longitudinal central axis;

a protruding member connected to an end of the plate and having a reference plane perpendicular to the longitudinal central axis contemporaneous with a first surface of a protruding member that faces the plate;

a first light emitting diode (LED) filament positioned on the top surface of the plate so that the first LED filament is on a first side of the longitudinal central axis and a long edge of the first LED filament is parallel with and proximate to the longitudinal central axis; and a second LED filament positioned on the top surface of the plate so that the second LED filament is on a second side of the longitudinal central axis and a long edge of the second LED filament is parallel with and proximate to the longitudinal central axis;

wherein the first LED filament and the second LED filament are longitudinally offset relative to one another so that the first LED filament is a different distance from the reference plane than the second LED filament.

2. The headlighting system of claim 1, wherein the first LED filament is configured for low beam generation.

3. The headlighting system of claim 1, wherein the second LED filament is configured for high beam generation.

4. The headlighting system of claim 1, wherein the first LED filament is 43.75 mm from the reference plane.

5. The headlighting system of claim 1, wherein the first and second LED filament are configured on the plate in a horizontal orientation.

6. The headlighting system of claim 1, wherein the reference positions for installation of the headlighting system are compatible with a vehicle.

7. The headlighting system of claim 1, wherein a beam performance of the headlighting system comprises a glare selected from a range of 500 candela to 2,700 candela.

8. The headlighting system of claim 7, wherein the glare comprises 944.3 candela.

9. The headlighting system of claim 1, wherein a beam performance of the headlighting system is selected from a range of 90,000 candela to 300,000 candela.

10. The headlighting system of claim 9, wherein the beam performance is 112,392 candela.

11. A vehicle headlighting system comprising:

a plate having a top surface, a bottom surface, and a longitudinal central axis;

a protruding member connected to an end of the plate and having a reference plane perpendicular to the longitudinal central axis;

a first light emitting diode (LED) filament positioned on the top surface of the plate in a horizontal position for low beam generation so that a long edge of the first LED filament is parallel to the reference plane; and a second LED filament positioned on the bottom surface of the plate in a horizontal position for high beam generation so that a long edge of the second LED filament is parallel to the reference plane, wherein the long edge of the first LED filament and the long edge of the second LED filament are offset relative to the longitudinal central axis so that a greater length of the long edge of the first LED filament and the second LED filament is positioned on one side of the longitudinal central axis.

12. The vehicle headlighting system of claim 11, wherein the first LED filament is 43.75 mm from the reference plane.

13. The vehicle headlighting system of claim 11, wherein the different distance of the first LED filament is compatible with a vehicle.

14. The vehicle headlighting system of claim 11, wherein a beam performance of the vehicle headlighting system comprises a glare selected from a range of 500 candela to 2,700 candela.

15. The vehicle headlighting system of claim 11, wherein a beam performance of the vehicle headlighting system is selected from a range of 90,000 candela to 300,000 candela.

16. The vehicle headlighting system of claim 11, wherein the second LED filament is symmetrically opposite the first LED filament about the longitudinal central axis.

* * * * *